(12) United States Patent
Duthie et al.

(10) Patent No.: US 11,873,927 B2
(45) Date of Patent: Jan. 16, 2024

(54) PIPE SUPPORT ASSEMBLY AND METHOD OF SUPPORTING A PIPE USING SUCH PIPE SUPPORT ASSEMBLY

(71) Applicant: POD Supports Limited, Turriff (GB)

(72) Inventors: Elaine A. Duthie, Aberdeen (GB); Brian J. Crawford, Auchenblae (GB)

(73) Assignee: POD Supports Limited, Aberdeenshire (GB)

( * ) Notice: Subject to any disclaimer, the term of this patent is extended or adjusted under 35 U.S.C. 154(b) by 65 days.

(21) Appl. No.: 17/779,671

(22) PCT Filed: Nov. 19, 2020

(86) PCT No.: PCT/GB2020/052956
§ 371 (c)(1),
(2) Date: May 25, 2022

(87) PCT Pub. No.: WO2021/105651
PCT Pub. Date: Jun. 3, 2021

(65) Prior Publication Data
US 2023/0013019 A1  Jan. 19, 2023

(30) Foreign Application Priority Data

Nov. 26, 2019  (GB) ..................................... 1917204

(51) Int. Cl.
*F16L 3/10* (2006.01)
*F16L 3/00* (2006.01)
(52) U.S. Cl.
CPC ............. *F16L 3/1091* (2013.01); *F16L 3/006* (2013.01)
(58) Field of Classification Search
CPC ... F16L 3/006; F16L 3/10; F16L 3/127; F16L 3/1066; F16L 3/1091
See application file for complete search history.

(56) References Cited

U.S. PATENT DOCUMENTS

| 4,172,578 A | 10/1979 | Pate | |
| 4,417,755 A * | 11/1983 | Gittleman | F16L 21/065 |
| | | | 285/423 |

(Continued)

FOREIGN PATENT DOCUMENTS

| CN | 108662290 A | 10/2018 | |
| DE | 202010006863 U1 * | 9/2010 | ............ F16L 3/1091 |

(Continued)

OTHER PUBLICATIONS

GB1917204.8 Search Report and Written Opinion from the Intellectual Property Office of the United Kingdom dated Dec. 23, 2019 (6 pages).

(Continued)

*Primary Examiner* — Eret C McNichols
(74) *Attorney, Agent, or Firm* — Amundsen Davis, LLC

(57) ABSTRACT

A pipe support assembly comprising: a body having a clamp device adapted to clamp the pipe within an aperture in the body, having first and second clamp arms and a fastening mechanism; a spacer adapted to be received within the aperture in the body having an inner face adapted to engage the pipe and an outer face adapted to engage at least one of the first and second clamp arms, to space at least one of the first and second clamp arms from the pipe. The spacer comprises at least two segments and the aperture is non-circular. Each spacer segment has a first circumferential end and a second circumferential end, and in at least two spacer segments in the spacer, the first circumferential end has a larger radial dimension than the second circumferential end. At least two spacer segments have a tapered arcuate profile between the first and second circumferential ends.

20 Claims, 6 Drawing Sheets

(56) References Cited

U.S. PATENT DOCUMENTS

| | | | |
|---|---|---|---|
| 4,997,148 A | 3/1991 | Sherman | |
| 5,014,940 A * | 5/1991 | Sherman | F16L 3/04 |
| | | | 248/62 |
| 5,261,633 A | 11/1993 | Mastro | |
| 9,447,899 B2 * | 9/2016 | Minami | F16L 3/1222 |
| 10,190,703 B2 * | 1/2019 | Alquier | F16L 3/16 |
| 10,408,365 B2 * | 9/2019 | McCarter | F16L 7/00 |
| 2009/0140106 A1 | 6/2009 | Johnson et al. | |
| 2013/0112817 A1 | 5/2013 | Unger | |
| 2013/0187013 A1 | 7/2013 | Minami | |
| 2017/0108145 A1 | 4/2017 | Bruno et al. | |
| 2018/0023729 A1 * | 1/2018 | Alquier | F16L 3/10 |
| | | | 248/74.4 |
| 2019/0145551 A1 * | 5/2019 | Schwalbe | F16L 3/1091 |
| | | | 248/67.5 |

FOREIGN PATENT DOCUMENTS

| | | |
|---|---|---|
| EP | 2634467 A1 | 9/2013 |
| EP | 2878493 A1 | 6/2015 |
| EP | 3537019 A1 | 9/2019 |
| JP | H10252946 A | 9/1998 |
| KR | 20100003342 U | 3/2010 |

OTHER PUBLICATIONS

PCT/GB2020/052956 International Search Report and Written Opinion of the International Searching Authority dated Jan. 22, 2021 (10 pages).

* cited by examiner

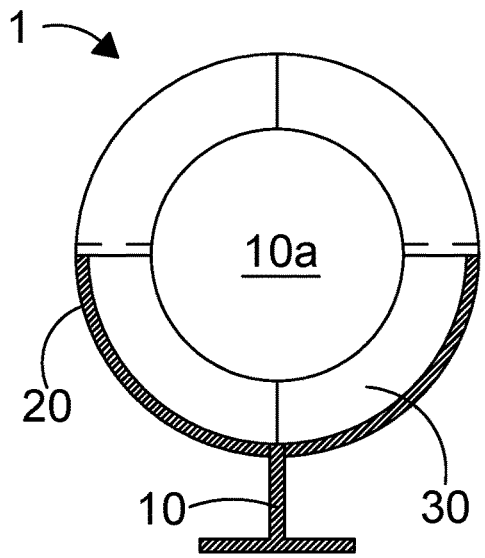 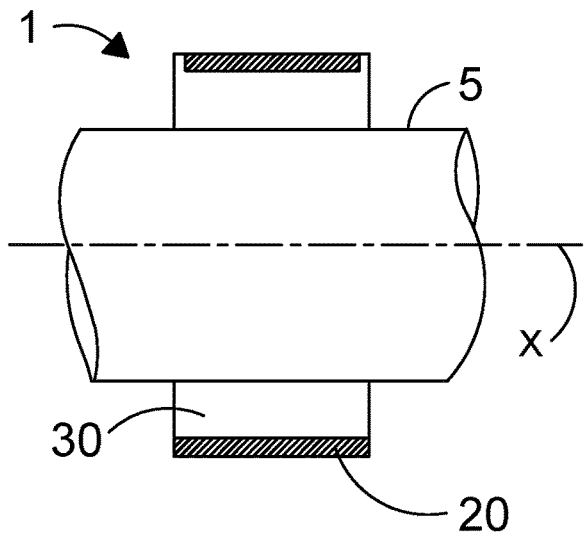
FIG. 1A  FIG. 1B
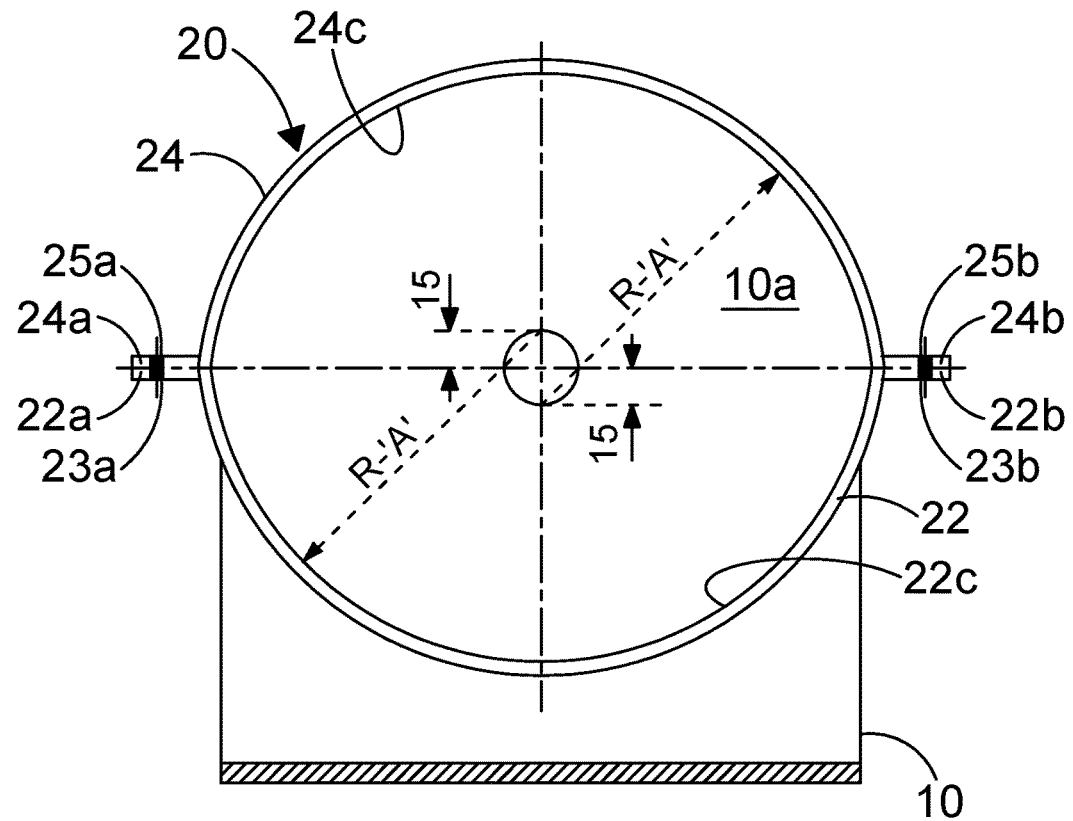
FIG. 2

PIPE SUPPORT ASSEMBLY AND METHOD OF SUPPORTING A PIPE USING SUCH PIPE SUPPORT ASSEMBLY

The present invention relates to a pipe support assembly for supporting pipes.

Pipes are conventionally supported by clamp devices mounted on bodies of pipe supports which are attached to a structure such as floor or wall or ceiling. The clamp device clamps the pipe to the body and resists movement of the pipe relative to the structure. The bodies of the pipe supports are normally pre-installed on the structure along the planned path of the pipe, and the clamp devices are thereafter closed around the pipe at spaced apart locations. Frequently the pipe is not centralised within the clamp device, so problems arise in ensuring that the pipes are properly clamped along the planned path. Clamping a pipe that is not co-axial with respect to the clamp device leads to deviation of the pipe from a straight line path, applies stress to the pipe, and can lead to undesirable movement and/or vibration of the pipe in use. The premature failure of pipes due to fatigue resulting from improper clamping can lead to loss of containment of the contents of the pipe, which can be costly as well as being environmentally unacceptable and/or dangerous. This is especially a consideration for large networks of pipes such as those common in offshore and onshore processing and recovery installations for the oil and gas industry, but applies in most situations where pipes are used.

SUMMARY

According to the present invention there is a provided a pipe support assembly comprising:
- a body having a clamp device adapted to clamp the pipe within an aperture in the body, the clamp device having first and second clamp arms and a fastening mechanism;
- a spacer adapted to be received within the aperture in the body, having an inner face adapted to engage the pipe and an outer face adapted to engage at least one of the first and second clamp arms when the pipe is clamped in the clamp device to space at least one of the first and second clamp arms from the pipe;
- the spacer comprising at least two segments;
- wherein the aperture is non-circular, wherein each spacer segment has a first circumferential end and a second circumferential end, and wherein in at least two spacer segments in the spacer, the first circumferential end has a larger radial dimension than the second circumferential end, and wherein each of the at least two spacer segments has a tapered arcuate profile between the first and second circumferential ends.

Optionally the spacer comprises at least three segments. Optionally the spacer comprises at least four segments. Optionally the spacer comprises at least five segments.

Optionally the spacer is installed (e.g. engaged with the pipe and the clamp device) after the body of the pipe support assembly has been installed (e.g. fixed into position), and optionally after the pipe has been run through the aperture of the body.

Optionally a temporary support device is provided to maintain the position of the pipe relative to the body e.g. against the force of gravity, before the spacer is installed and after the pipe extends through the aperture. Optionally the temporary support device engages with the pipe and the body. Optionally the temporary support device comprises an adjustment mechanism e.g. one or more jacking bolts, optionally to allow the temporary support device to be adjusted to the space around the pipe in the aperture, optionally to allow the temporary support device to be tensioned between the pipe and the body. Optionally the temporary support device is disposed outside a plane of the spacer, for example, parallel to the plane of the spacer. Optionally the temporary support device is disposed outside a plane of the clamp arms, for example, parallel to the plane of the clamp arms. Optionally the temporary support device is separated from the spacer along the axis of the pipe, and optionally the temporary support device allows the spacer to be installed between the pipe and the body, e.g. without disturbing the temporary support device. Optionally the temporary support device is disposed on one, or optionally both, of the sides (e.g. the axially-facing surfaces) of the spacer. Optionally the temporary support device comprises at least two (optionally at least four) jacking bolts, which are optionally orientated symmetrically (e.g. equidistantly) around the circumference of the body. Optionally the jacking bolts are aligned with radii of the arcs of the first and/or second clamp arms. Optionally the at least two jacking bolts are orientated at symmetrical e.g. equal but opposing angles relative to vertical, for example from 10 degrees to 60 degrees either side of vertical, preferably from 30 degrees to 50 degrees either side of vertical. Optionally the temporary support device allows adjustment of the position of the pipe relative to the body, optionally after the temporary support device is engaged with the pipe. Optionally the temporary support device incorporates a locking mechanism, which is adapted to lock the position of the temporary support device (e.g. jacking bolts) relative to the body, optionally after the temporary support device is engaged with the pipe. Optionally the locking mechanism comprises a fastener e.g. a split pin, which optionally restricts movement (optionally rotational movement, optionally longitudinal movement) of the temporary support device relative to the body, and optionally relative to the pipe.

Optionally the temporary support device can be disengaged from the pipe within the body after the spacer is installed, but can optionally be retained in proximity to the pipe. Optionally the temporary support device is adapted to support the pipe within the body in the event of structural degradation and/or damage to the spacer installed within the body, for example in the event of fire, or escape of high temperature or corrosive fluids or gases from the pipe.

Optionally the required dimensions of the spacer are determined by measurement e.g. by mapping with the pipe in place within the aperture and the first and second clamp arms closed around the pipe. Optionally the radial distance between the inner face of the first and second clamp arms and the outer surface of the pipe is measured in a number of different spaced apart locations around the circumference of the pipe. The number of spaced apart locations in which the radial distance is measured can optionally be at least 3 or 4, but in most examples the number can be greater, for example, 5-10 locations, 10-15 locations, or 20-30 locations or more.

Optionally the required dimensions of the spacer can be obtained by direct (optionally manual) measurement, optionally with a measuring gauge (e.g. a pair of callipers), or optionally with a tape measure. Optionally the determination of the required dimensions of the spacer is performed by scanning the pipe in the clamp before making the spacer, optionally by 3-d scanning. Optionally the determination of the dimensions of the spacer can be performed by photogrammetry.

Optionally the spacer is formed for the pipe support assembly based on the measured data concerning the measured radial distance between the clamp arms and the pipe. Because the pipe is very rarely in a consistent position within the aperture in different bodies, the spacer is optionally formed specifically for one clamp device, e.g. with a bespoke shape of spacer to allow for misalignment e.g. eccentricity between the pipe and the aperture, and/or ovality of the pipe, and/or misalignment of the axis of the pipe and the axis of the aperture, optionally including instances where the axis of the pipe and the axis of the aperture are parallel, and instances where these axes are non-parallel. Hence the body can be mass produced and pre-installed on a structure at a work site to fit many different pipe configurations without the need to take account of the misalignment of the pipe with respect to the aperture in different bodies when installing the bodies, and the spacer can be made specifically for each individual clamp device such that the misalignment is accounted for in each case by the dimensions of the spacer rather than the body. This allows for better support for the pipe when clamped in position, which results in reduced stress on the pipe, and reduced tendency to bend the pipe to fit into an aperture that is not in good alignment with the pipe, for example, in which the pipe is off-centre with respect to the aperture in the clamp device.

At least a part of the inner face of the spacer is optionally arcuate. At least a part of the outer face of the spacer is optionally arcuate. Optionally the inner face of the spacer has a constant radius. Optionally the inner face of the spacer is continuously arcuate, and optionally the outer face of the spacer comprises one or more arcuate portions, optionally connected by non-arcuate portions. Optionally at least some arcuate portions on the outer face of the spacer have a constant radius, and optionally at least some have a common radius, which is optionally matched with the radius on an inner face of the engaging clamp arms. Optionally the inner face of the spacer is circular, and optionally the arcuate portions of the outer face of the spacer form arcs of circles. Optionally the radius of the inner face and outer face portions of the spacer are unequal, and optionally the radius of the portions of the outer face are greater than the radius of the inner face. Optionally the radii of the inner face and outer face portions of the spacer have offset centres.

Optionally the outer face of the spacer can be arcuate but non-circular. For example, the outer face of the spacer could be at least partly parabolic, or elliptical or oval etc. Optionally the outer face of the spacer (and optionally the inner face of the clamp arms) comprises a number of arcs forming an incomplete circle (e.g. two arcs of a circle, each less than 180°, optionally with vertices between the arcs on the outer face of the spacer. Optionally the inner face of the spacer forms a circle around the pipe.

Optionally the entire space between the pipe and the clamp device is filled with the spacer, but this is not essential in all examples, and in some cases, there can be channels extending through the spacer or chambers in the spacer between the pipe and the clamp device. Optionally these can be at the periphery of the spacer, e.g. in communication with an outer or inner face of the spacer, or can be spaced radially away from the outer and inner faces of the spacer, e.g. between the outer and inner faces of the spacer.

At least a part of the inner face of each segment is optionally arcuate. At least a part of the outer face of each segment is optionally arcuate. Optionally the inner face of each segment is continuously arcuate, and optionally the outer face of each segment comprises one or more arcuate portions, optionally connected by non-arcuate portions.

Optionally the inner face of each segment forms an arc of a circle, and optionally the arcuate portions of the outer face of the segment form arcs of circles. Optionally the radius of the inner face and outer face portions of the segment are unequal, and optionally the radius of the portions of the outer face are greater than the radius of the inner face. In other words, in each spacer segment, optionally an inner face has at least one arcuate portion and optionally an outer face has at least one arcuate portion, and optionally a radius of at least one arcuate portion on the inner face is less than a radius of at least one arcuate portion on the outer face. Optionally the radii of the inner face and outer face portions of the segment have offset centres.

The inner face of each segment is optionally in contact with the pipe continuously along the inner face of the segment, but in some cases, the inner face adapted to engage the pipe on at least one segment can be discontinuous along the periphery of the segment, so that, for example, the segment only engages the pipe on a portion of the periphery of the segment. Likewise, the outer face of each segment is optionally in contact with the clamp device continuously along the radially outwardly facing periphery of the segment, but in some cases, the outer face adapted to engage the clamp device on at least one segment can be discontinuous along the outer periphery of the segment, so that the segment only engages the clamp device on a portion of the periphery facing the clamp device. Optionally this can provide chambers or voids within the spacer, or channels through the spacer device in an axial direction along the pipe.

Optionally the first and second clamp arms are symmetrical, e.g. around a line connecting the two ends of the clamp arms, but this is not essential. Optionally the first and second clamp arms are connected at least at one end by the fastening mechanism which can optionally comprise a fixing passing through a pair of plates on respective ends of the first and second clamp arms. Optionally the fastening mechanism is adapted to apply a force to the first and second clamp arms, for example, by interaction of a screw thread, or over-centre latch, etc. so that the force applied by the fastening mechanism to the clamp arm urges the first and second clamp arms together, to clamp the pipe and the spacer in the aperture. Optionally each clamp arm has a connection plate at least at one end (e.g. the same end) and the connection plates are optionally arranged in a parallel stacked arrangement when the clamp arms are closed (i.e. clamped) around the pipe. Optionally each arm has a connection plate at each end. Optionally when the spacer is clamped between the clamp arms and the clamp arms are closed around the pipe the plates are separated, e.g. by a few mm, e.g. 2-5 mm, but this distance can vary depending on the characteristics of the assembly and its materials, in order to apply compression to the spacer when the clamp arms are closed around the spacer and the pipe, although the ends of the arms (e.g. the plates) can be in contact without any spacing between them in some examples. Optionally the clamping force is a resilient clamping force. Optionally at least one of the clamp arms has at least a small degree of inherent resilience. Optionally the spacer can have at least a small degree of inherent resilience. Optionally the spacer (optionally each spacer segment) is resistant to deformation.

Optionally one of the clamp arms (e.g. a lower clamp arm) is fixed to the body, and optionally one of the clamp arms (e.g. an upper clamp arm) is removable from the body, for example, the said one clamp arm is optionally separable from the other clamp arm.

Optionally the clamp device comprises a single clamp arm, optionally with a single fastening device. Optionally the opposing ends of the single clamp arm are circumferentially overlapped. Optionally the fastening device restricts the size of the aperture of the body, and optionally applies compression to the spacer, by increasing the circumferential overlap of the opposing ends of the single clamp arm, which optionally reduces the diameter of the of the aperture of the body.

Optionally the spacer segments are separate from one another, and optionally can be individually inserted into the space between the pipe and the clamp device.

Optionally at least one of the spacer segments (optionally at least two or possibly three) is moved e.g. inserted between the pipe and the clamp arms in a radial direction with respect to the pipe. Optionally at least one of the spacer segments (optionally at least two or possibly three) is moved e.g. inserted between the pipe and the clamp arms in a circumferential direction with respect to the pipe. Optionally the movement e.g. insertion has a radial component and a circumferential component, for example, a radial component, and then a circumferential component. Optionally the insertion of at least one of the spacer segments, and optionally of all of the spacer segments, does not include an axial component with respect to the pipe.

Optionally the spacer has a circumferential lip running around at least a portion of each outer face of the spacer, adapted to extend radially with respect to the axis of the aperture, past an inner face of at least one of the clamp arms. This resists movement of the spacer and its segments in an axial direction parallel to the pipe when the spacer is clamped between the clamp arms and the pipe. Optionally the radial dimension of the lip is constant around the outer face of the spacer, and is independent of the radial dimension of the spacer, which optionally increases (or decreases) circumferentially around the spacer. Optionally the lip is continuous around the outer face of at least the spacer segments engaging with at least one of the clamp arms (and optionally the outer face of all spacer segments), but could be discontinuous in some examples, leaving gaps in the outer face without a lip.

Optionally the spacer can comprise at least three segments, optionally at least four segments. Optionally not all of the segment portions are identical, although in some cases at least two or possibly three of the segment portions could be symmetrical. Optionally the segments are non-identical. Optionally the segments fill the space between the first and second clamp arms and the pipe when the pipe is clamped in the clamp device and optionally transfer the clamping force from the clamp arms to the pipe. Optionally the spacer is formed from a plastics material e.g. Ultem, Vespel, Torlon or PEEK. Optionally the spacer can be formed from a metallic material, or optionally from a resinous material e.g. RTV (room temperature vulcanising) silicone rubber or phenolic resin GRP (glass reinforced plastic), or optionally from a ceramic material. Optionally the material from which the spacer is formed provides vibration damping. Optionally the internal structure of the spacer segments can provide vibration damping, for example by being formed (e.g. 3D-printed) with an internal cellular, truss or web structure. Optionally the spacer segments may comprise a viscoelastic material, which can optionally be layered or laminated with non-viscoelastic e.g. thermoplastic material. Optionally the spacer segments may comprise interlocking fingers, which optionally extend in a radial direction e.g. perpendicular to the axis of the pipe, and which are adapted to interlock e.g. engage with corresponding fingers of adjacent spacer segments. Optionally the material from which the spacer is formed has high heat tolerance, or optionally high thermal conductivity, or optionally low thermal conductivity, and is optionally chemically unreactive (e.g. inert) with respect to the pipe material. Optionally the spacer material is fire resistant. Optionally the spacer segments may be coated, covered or screened by an intumescent or fireproof material.

Optionally the spacer is formed by additive manufacturing, e.g. by printing the spacer segments, e.g. on a 3D printer, or optionally by moulding or casting. Optionally the spacer is formed by milling, e.g. CNC machining of a hole or aperture in a pre-manufactured plate or 'blank' corresponding to the position of the pipe relative to a particular pipe support assembly. In some cases such 'blanks' can be milled or machined 'on-site' e.g. at the installation location of the pipe support assembly, or alternatively, milling, machining or shaping of the 'blanks' can be carried out remotely. Optionally such plates or 'blanks' are manufactured with standard or consistent dimensions, which optionally correspond to the dimensions of the aperture of the pipe support. Optionally 'blanks' can be formed by moulding (e.g. injection moulding) or casting. Optionally a single mould or cast can be used to manufacture more than one spacer e.g. 10, 100 or more than 1,000. Optionally a single size of 'blank' (e.g. 'blanks' with specific dimensions) can be used as spacers for more than one pipe outer diameter, for example, a narrow range of pipe outer diameters.

Optionally each of the segments of the spacer occupies an asymmetrical space between the clamp arms and the pipe; in other words, each segment is optionally different from at least one (and optionally each) of the others in one spacer, and the plane of each segment in a plane parallel to the axis of the aperture is asymmetric.

Optionally at least one (and optionally two) of the spacer segments has a first end and a second end circumferentially spaced from the first end. Optionally the first end (and optionally the second end) of each spacer segment has an end face which is planar. Optionally the planar end faces on the ends of each spacer segment are parallel with the radius of the arc of the inner face of the segment. Optionally the end faces at the ends of adjacent spacer segments (e.g. at the divisions between adjacent spacer segments) are coplanar. Optionally the inner face of each spacer segment extends around a non-overlapping portion of an outer circumference of the pipe e.g. an arc of an outer surface of the pipe. Optionally divisions between adjacent spacer segments extend generally with respect to the outer face of the spacer segment, for example, between the outer face and a centre of a notional circle of which the outer face forms part of the circumference. Optionally the arcs around the outer surface of the pipe corresponding to the inner face of each spacer segment are contiguous, optionally around the outer circumference of the pipe, optionally the whole outer circumference of the pipe. In other words, optionally the spacer surrounds the pipe. Optionally the arcs of the inner face of the spacer segments equally divide the outer circumference of the pipe. For example, if there are three spacer segments, the arc of the inner face each spacer segment can be approximately 120 degrees; if there are four spacer segments, the arc of each spacer segment can be approximately 90 degrees. Optionally the arcs of the spacer segments are not equal. Optionally the space between the pipe and one of the clamp arms (e.g. the upper clamp arm) can be filled by a single spacer segment, which optionally has an outer face with an arc of approximately equal to, or optionally less than, 180 degrees.

Optionally the arcs of the inner faces of the spacer segments are not contiguous around the outer surface of the pipe, and optionally only extend partially around the outer circumference of the pipe. Optionally there can be a circumferential gap between one or more adjacent spacer segments. Optionally slots (optionally radial slots) are provided between one or more adjacent spacer segments.

Optionally the inner face and outer face of each of the at least two spacer segments converge from the first circumferential end to the second circumferential end of the segment. Optionally the radial dimension of the at least two spacer segments decreases continuously between the first and second circumferential ends. The radial minimum of the segment is optionally at the second circumferential end of the segment and the radial maximum of the segment is optionally at the first circumferential end of the segment. Optionally the second circumferential end of the segment (optionally of at least two segments) is inserted (e.g. radially with respect to the pipe) into the space between the pipe and at least one of the clamp arms before the first circumferential end of the segment (optionally of the said at least two segments). Optionally the movement of at least two of the segments into the space between the pipe and at least one of the clamp arms has a radial component and a circumferential component.

Optionally the radial minimum of at least one spacer segment within a spacer is smaller than the radial minimum of at least one other spacer segment within the spacer. Optionally there is a gradation of radial minima, e.g. segment 1 has a smaller radial minimum at its second end than segment 2, which optionally has a smaller radial minimum at its second end than segment 3, which optionally has a smaller radial minimum at its second end than segment 4. However, in some cases, two of the spacer segments in a spacer can have identical radial minima (and can optionally be identical).

Optionally the segments of the spacer are inserted into the radial gap between the outer surface of the pipe and the inner face of the clamp arms in a particular sequence, in which the radially narrowest end(s) (e.g. the second circumferential end(s), or in other words the radial minimum) of the remaining available segments is optionally inserted first into the space between the pipe and the clamp arms. For example, in an example where there are 4 spacer segments, 1, 2, 3, and 4, each having first and second circumferential ends with converging inner and outer faces, and in which the spacer segments have second circumferential ends with gradually increasing radial minima e.g. 1<2<3<4, the first spacer segment selected for insertion into the space would optionally be the spacer segment 1, with the smallest radial minima at its second circumferential end, followed by 2, followed by 3, followed by 4 etc. Optionally this sequence of insertion is followed for at least sufficient spacer segments to fill the space between the pipe and at least one of the clamp arms, e.g. the lower clamp arm. In some examples, the sequence of insertion is not necessarily followed for the whole of the space around the pipe between the pipe and the clamp arms, and could for example, be followed for filling the space between the pipe and one clamp arm (e.g. the lower), but not necessarily for the space between the pipe and the other clamp arm (e.g. the upper). Optionally the spacer segment with the smallest radial end dimension at its second circumferential end (e.g. segment 1 in the example above) has a first circumferential end (with a larger radial end dimension than the second circumferential end) that matches the radial end dimension on the next adjacent segment. In other words, in the example above, the larger radial end of spacer segment 1 has the same radial end dimension as the smaller radial end of spacer segment 2, etc.

Optionally there is a division between adjacent spacer segments at a radial minimum between the pipe and the clamp device. In other words, the spacer is divided at least at the shortest radial distance between the pipe and the clamp device.

Optionally there is a division between adjacent spacer segments (optionally in addition to the division at the radial minimum between the pipe and the clamp device) at the radial minimum between the pipe and one clamp arm, e.g. the lower clamp arm. Optionally there can be no divisions between the spacer segments which fill the space between the pipe and the opposing clamp arm, e.g. the upper clamp arm. Optionally the upper clamp arm is removed before inserting the one or more spacer segments which fill the space between the pipe and the upper clamp arm. Optionally the insertion of spacer segments between the pipe and the upper clamp arm comprises only a radial component, optionally without a circumferential component.

Optionally the first and second clamp arms have inner faces which engage with the spacer and which are arcuate. Optionally the first and second clamp arms are convex, and connect together at opposite ends of the clamp arms. Optionally the inner faces on each of the first and second clamp arms form arcs of a circle, and optionally have a constant radius, which is not necessarily the same, e.g. the first and second clamp arms could each have different radii, but in each of the first and second clamp arms the radius of the inner face of the clamp arms is optionally constant. Optionally the circumference of each of the first and second clamp arms forms a partial semi-circle, for example, less than a full semi-circle, e.g. between 180° and 90°. Thus, in the first clamp arm, the circumferential distance between the two ends of the first clamp arm is less than $r\pi$ where r=the radius of the clamp arm. The circumferential distance between the two ends of the second clamp arm is also optionally less than $r\pi$ where r=the radius of the second clamp arm, which could be different from the radius of the first clamp arm. Thus the two clamp arms extend for less than 180° of the semi-circle defined by their radius.

Optionally the arcuate portions on the first and second clamp arms (e.g. the inner faces) have offset centres. In other words, the centre of the first clamp arm (being the point equidistant from points on the inner face of the first clamp arm and defining the endpoint of the radius of the first clamp arm between the inner face of the first clamp arm and the centre) is offset from the centre of the second clamp arm. Optionally the first clamp arm centre is closer to the second clamp arm than to the first clamp arm, and optionally the second clamp arm centre is closer to the first clamp arm than to the second clamp arm. Optionally the centres are offset from the centre of the clamp device by the same amount in opposite directions. Optionally the centre of the aperture of the body is offset from the centres of both the first and second clamp arms, and optionally the centre of the aperture is equidistant between the centres of the arcuate portions on the inner faces of the first and second clamp arms.

The non-circular aperture optionally prevents or resists rotation of the spacer segments (optionally in unison) within the aperture, e.g. around the inner faces of the clamp arms. Optionally the positions of the spacer segments relative to the first and second clamp arms are fixed after all the spacer segments have been inserted into the radial gap between the outer surface of the pipe and the inner faces of the clamp arms. Therefore, the position of the pipe relative to the body (and optionally to the clamp device) is optionally fixed after the spacer segments have been inserted, and optionally after the spacer segments have been clamped between the clamp arms, thereby preventing or resisting rotation of the pipe relative to the body.

Optionally a centre of the arc of the inner face of at least one the spacer segment is offset from the centre of the arc of the outer face of that spacer element. Optionally at least two spacer elements have inner and outer faces formed as arcs with offset centres. Optionally at least three spacer elements have inner and outer faces formed as arcs with offset centres.

Optionally the centre of the arc of the inner face of the spacer segment is coincident with a central axis of the pipe, which may or may not be coincident with the centre of the aperture. Optionally the centre of the arc of the outer face of spacer segment is offset from the central axis of the pipe. Optionally in at least one spacer segment in a spacer (and typically in more than one segment, e.g. 2 or 3, or 4 segments) the centre of the arc of the inner face of the spacer segment is offset from the centre of the arc of the outer face.

Optionally the complete spacer is toroidal. Optionally a cross section through the spacer has flat inner and outer walls corresponding to the inner and outer faces, and the cross section can be generally rectilinear (e.g. a section through the spacer parallel to the axis of the pipe can be rectilinear, e.g. square or rectangular).

The invention also provides a method of supporting a pipe with a pipe support assembly, the pipe support assembly comprising:
  a body having a clamp device adapted to clamp the pipe within an aperture, the clamp device having first and second clamp arms and a fastening mechanism,
  a spacer adapted to be received within the aperture in the body, having an inner face adapted to engage the pipe and an outer face adapted to engage at least one of the first and second clamp arms when the pipe is clamped in the clamp device to space at least one of the first and second clamp arms from the pipe, wherein the aperture is non-circular, and wherein the method comprises:
  assembling the clamp device around the pipe such that the pipe is disposed in the aperture;
  measuring the radial distance between an inner face of the first and second clamp arms and the outer surface of the pipe in a number of different spaced apart locations around the circumference of the pipe;
  forming the spacer for the pipe support assembly in at least two segments based on the measured data concerning the measured radial distance between the clamp arms and the pipe, wherein each spacer segment has a first circumferential end and a second circumferential end, and wherein in at least two spacer segments in the spacer, the first circumferential end has a larger radial dimension than the second circumferential end, and wherein each of the at least two spacer segments has a tapered arcuate profile between the first and second circumferential ends;
  inserting the at least two spacer segments between the inner face of the clamp arms and the outer surface of the pipe; and
  closing the clamp arms around the outer face of the spacer segments to clamp the pipe within the aperture.

The invention also provides a spacer for a pipe support, the spacer having at least two segments adapted to space a pipe being clamped from a clamp device, each segment having an outer face adapted to engage the clamp device, and an inner face adapted to engage the pipe, and wherein a radius of an arc on at least a part of the outer face is greater than the radius of an arc on at least a part of the inner face, wherein each spacer segment has a first circumferential end and a second circumferential end, and wherein in at least two spacer segments in the spacer, the first circumferential end has a larger radial dimension than the second circumferential end, and wherein each of the at least two spacer segments has a tapered arcuate profile between the first and second circumferential ends.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention will now be described in detail with reference to the accompanying Figures. Still other aspects, features, and advantages of the present invention are readily apparent from the entire description thereof, including the Figures, which illustrates a number of exemplary aspects and implementations. The invention is also capable of other and different examples and aspects, and its several details can be modified in various respects, all without departing from the spirit and scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa.

Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee.

In the description that follows, like parts are marked throughout the specification and drawings with the same reference numerals, respectively. The drawings are not necessarily to scale. Certain features of the invention may be shown exaggerated in scale or in somewhat schematic form, and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

BRIEF DESCRIPTION OF THE DRAWINGS

In the accompanying drawings:

FIGS. 1a and 1b are respectively front and side schematic elevations of an example of a pipe support assembly;

FIG. 2 is a front elevation of the body and clamp of the pipe support assembly shown in FIG. 1;

FIGS. 4a and 4b are respectively perspective views of the spacer segment shown in FIGS. 3a and 3b, and an alternative spacer segment with different radial dimensions to the spacer segment shown in FIG. 4a;

DETAILED DESCRIPTION

Figure 3A:
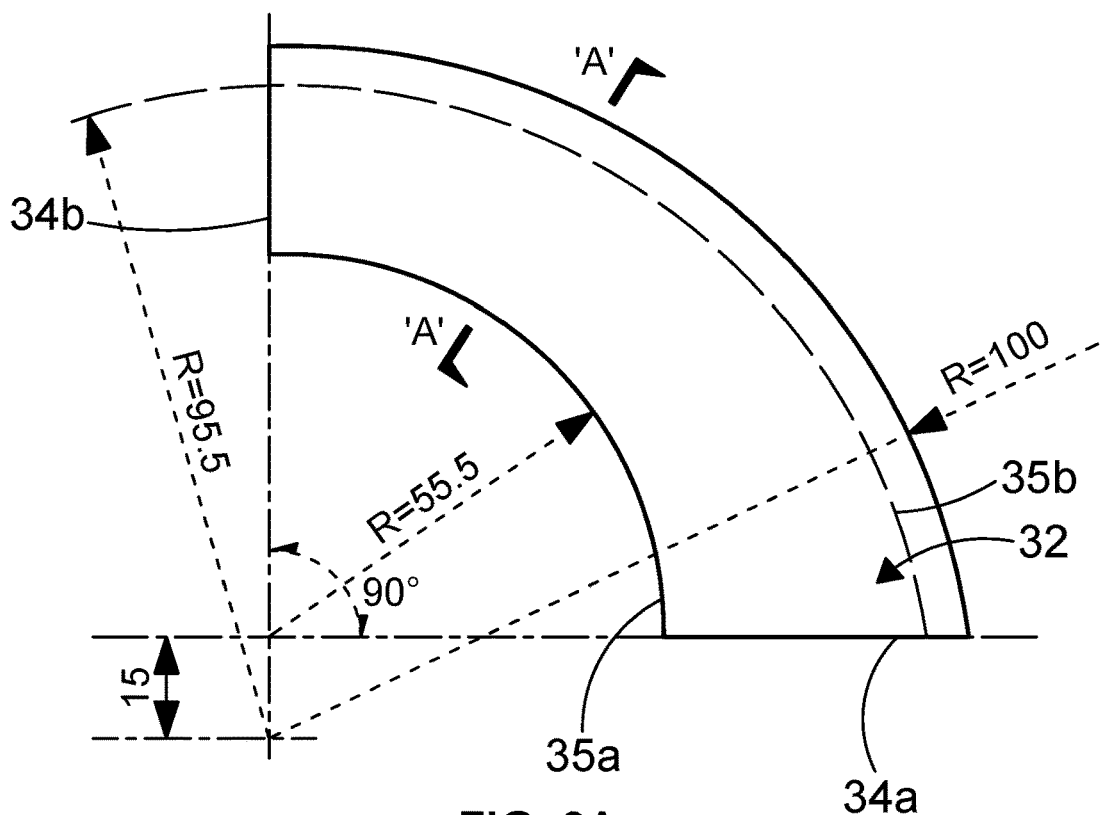
FIGS. 3a and 3b are respectively front and side elevations of a segment of the spacer of the pipe support assembly shown in FIG. 1.

Referring now to the drawings, a first example of a pipe support assembly 1 in accordance with the invention is shown schematically in FIGS. 1a and 1b. In this example the pipe support assembly 1 comprises a body 10 with a clamp 20. The clamp 20 is only generally circular in shape, and forms an aperture 10a of the body 10. A pipe 5 with an axis X is shown in FIG. 1b passing through the aperture 10a. The outer diameter of the pipe 5 is smaller than the inner diameter of the clamp 20, and the space between the outer surface of the pipe 5 and the inner face of the clamp 20 is filled by a spacer element 30.

As best seen in FIG. 2, in this example the clamp 20 comprises fixed and removable clamp arms 22, 24. The fixed clamp arm 22 is typically rigidly joined to the body 10, and is typically disposed vertically above the body 10 after the pipe support assembly has been installed as shown in FIG. 2. Optionally the body 10 and fixed clamp arm 22 can be installed in any orientation, depending on the available fixing surfaces and positioning requirements of the pipe 5 which passes through the aperture 10a of the body 10.

The removable clamp arm 24 is adapted to be disconnected and removed from the fixed clamp arm 22, and then replaced and re-connected. In this example both the fixed and removable clamp arms 22, 24 comprise connection brackets or plates 22a, 22b and 24a, 24b at opposing distal ends of respective clamp arms 22, 24. The connection plates 22a, 22b of the fixed clamp arm 22 engage with the connection plates 24a, 24b of the removable clamp arm 24 when the removable clamp arm is connected to the fixed clamp arm. Typically the connection plates 22a, 22b, 24a, 24b are planar, and when the clamp arms 22, 24 are connected, typically the facing planar surfaces of opposing pairs of connection plates e.g. 22a and 24a, and 22b and 24b approach each other, and optionally contact each other in a stacked arrangement, optionally with the planes of the connection plates 22a, 24a, and 22b, 24b at least at one end of the clamp arms 22, 24 being mutually parallel. Optionally the engaging (e.g. upper) surface of at least one connection plate on the fixed clamp arm 22 is aligned (e.g. coincident) with an axis that passes through the centre of the aperture 10a and at least one end of the fixed end of the clamp arm 22. Optionally an axis passing through the opposing distal ends of the fixed clamp arm 22, which is optionally coincident with an axis passing through the opposing distal ends of removable clamp arm 22 when the clamp arms 22, 24 are connected to each other, is optionally generally parallel to the fixing surface to which the body 10 of the pipe support assembly 1 is fixed.

Also in this example, the connection plates 22a, 22b, 24a, 24b further comprise respective apertures 23a, 23b and 25a, 25b, which can for example be formed by drilling through connection plates 22a, 22b, 24a, 24b. Typically the apertures in opposing pairs of connection plates e.g. 22a and 24a, and 22b and 24b are aligned when the clamp arms 22, 24 are connected. In this example the apertures are circular and threaded on their inner surfaces, but in other examples the apertures may be non-circular, or non-threaded (e.g. for use with a fastener such as a nut and bolt arrangement), or may not be present if connection plates 22a, 24a and 22b, 24b are adapted to be connected by another means (e.g. by a fastener such as a toggle clamp or latch clamp).

Furthermore in this example, fixing elements, typically in the form of threaded bolts (not shown in the Figures), are provided for connecting opposing pairs of connection plates e.g. 22a and 24a, and 22b and 24b. In this example the threaded bolts can be passed through the apertures in connection plates 22a, 22b, 24a, 24b and tightened in order to tension the connection between the fixed and removable clamp arms 22, 24. An optional washer can be provided between the bolt and one of the clamp arms 22, 24 (usually the upper clamp arm 24).

As also shown in FIG. 2, in this example the inner faces 22c, 24c of the fixed and removable clamp arms 22, 24 are symmetrical and form a portion of a circle, but are not fully semi-circular; in other words, the inner faces of the clamp arms 22, 24 form arcs of a circle that are less than 180 degrees. Therefore, when the clamp arms 22, 24 are connected as shown in FIG. 2, the aperture 10a in the body formed by the inner faces 22c, 24c of clamp arms 22, 24 is not fully circular, but lens shaped. Thus, there is a slight discontinuity in the inner face of the connected clamp arms 22, 24 adjacent to the connection plates 22a, 22b, 24a, 24b at the opposing distal ends of the clamp arms 22, 24.

As also best seen in FIG. 2, the radii of the circular arcs of the inner faces 22c, 24c of the clamp arms 22, 24 are equivalent in this example, but the centres of the circular arcs of the clamp arms 22, 24 are offset from each other. The centres of the clamp arms 22, 24 are in this example optionally aligned along a centreline of the aperture 10a perpendicular to the centreline axis through the connection plates 22a, 22b, 24a, 24b of the connected clamp arms 22, 24, which ensures that the apertures 23a, 25a and 23b, 25b through the connection plates are aligned with each other when the clamp arms 22, 24 are connected. Also in this example, the centres of the circular arcs of the clamp arms 22, 24 are offset equidistantly approximately 15 mm (0.015 m) either side of the centreline of the aperture 10a through connection plates 22a, 22b, 24a, 24b, but in other examples, the centres of the clamp arms 22, 24 can be equidistantly offset by a greater or lesser distances, and in further examples, the centre of one clamp arm can be offset from the centreline through the connection plates 22a, 22b, 24a, 24b by a lesser or greater distance than the centre of the opposing clamp arm.

Figure 3B:
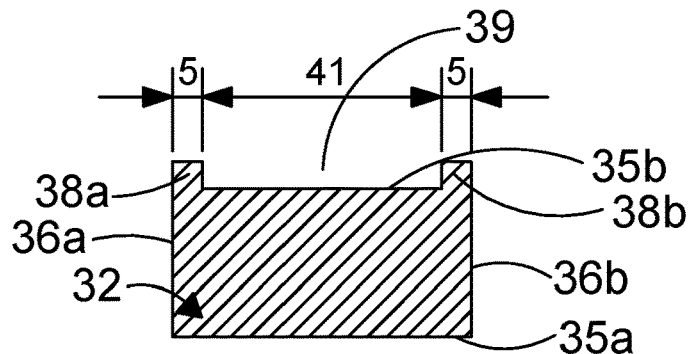
Figures 4A, 4B:
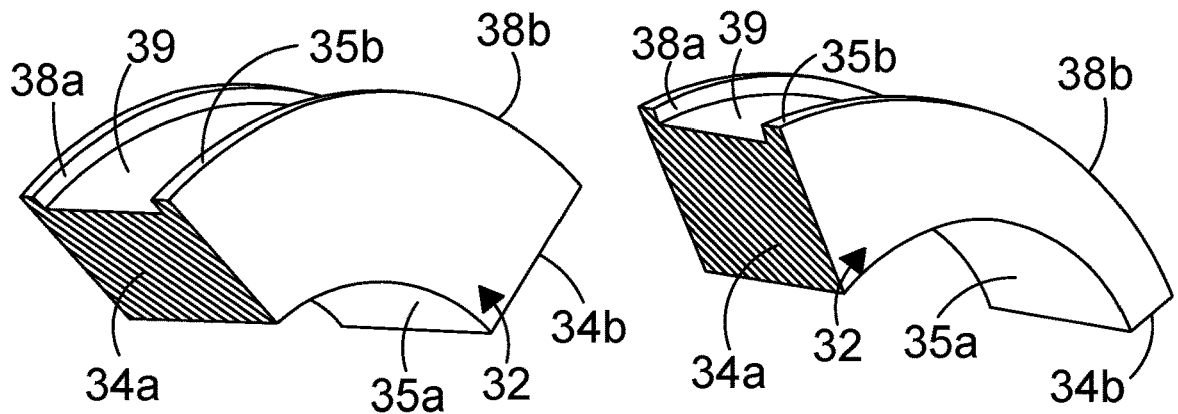

FIGS. 3a and 3b illustrate one segment 32 of the spacer 30 (see FIGS. 1a and 1b), which is also shown in perspective in FIG. 4a. In this example the spacer 30 is a generally toroidal body which is divided into three or more portions. More particularly, in this example the spacer 30 is a toroid with a rectangular cross section whose radial dimension increases and decreases around the circumference of the toroid. The spacer 30 is divided into spacer segments 32 by dividing the spacer 30 along two or more radii of the spacer 30, such that each spacer segment 32 has first and second planar end surfaces 34a, 34b which are optionally coplanar with a radius of the spacer 30. Each spacer segment 32 also comprises a radially inner face 35a and a radially outer face 35b.

The spacer segment 32 shown in FIG. 3a has an arc on its inner face 35a of 90 degrees, or in other words, the spacer segment 32 is a quarter portion of the spacer 30. Other spacer segments can have arcs on an inner face of less than or greater than 90 degrees. For example, if the spacer 30 is divided into three spacer segments of equal angular dimension, each spacer segment can have an arc on its inner face 35a of approximately 120 degrees. In some examples, the spacer 30 can be divided into spacer segments 32 with unequal angular dimensions, such as those seen in FIG. 5e, and/or with divisions between spacer segments which are not precisely coincident with the radius of the spacer. The spacer 30 is typically divided into at least two segments, or three, or four, or five or some other larger number of segments, which can optionally be varied within the scope of the invention depending on the details of the pipe and clamp. In some examples of the invention, there are at least three segments. Larger diameter pipes can require large dimensions of spacer to accommodate the radial spacing between the pipe and the clamp, and it can be useful to divide the spacer into smaller more numerous segments as the pipe and clamp dimensions increase so that the desired dimensions of the spacer segments are not limited by the capacity of the 3D printer, which can generally continue printing spacer segments of generally consistent size ranges which can be used for different sizes of pipes.

As shown in FIG. 3a, in this example the centre of the arc of the inner face 35a of the spacer segment 32 is offset from the centre of the arc of the outer face 35b. When the pipe support assembly 1 is assembled, the inner face 35a of each spacer segment 32 contacts the outer surface of the pipe 5, and the outer face 35b of each spacer segment 32 contacts an inner face of at least one (or both in some examples, e.g. FIG. 5e) of the clamp arms 22, 24. Therefore in FIG. 3a, the centre of the arc of the inner face 35a corresponds to the centre of the pipe 5, which is offset from the centre of the arc of the outer face 35b, which corresponds to the centre of the aperture 10a of the body 10. In this example, the radius of the inner face 35a (which is approximately equal to the radius of the outer surface of the pipe 5) is 55.5 mm (0.0555 m), and the radius of the outer face 35b (which is approximately equal to the radius of the inner face of the clamp arms 22, 24) is 95.5 mm (0.0955 m), but in other examples either radii may be larger or smaller, to accommodate other pipes with a larger or smaller outer diameter, within larger or smaller apertures of other pipe support assembly bodies.

The first end surface 34a of the spacer segment has a greater radial dimension than the second end surface 34b due to the offset between the centres of the arcs of the inner and outer faces 35a, 35b. Therefore, the radial dimension of the spacer segment 32 gradually decreases (or tapers) from the first end surface 34a to the second end surface 34b.

As best seen in FIG. 3b, in this example the spacer segment 32 further comprises a pair of circumferential lips 38a, 38b which extend radially for a short distance from the outer face 35b of the spacer segment, adjacent to side surfaces 36a, 36b of the spacer segment. In this example the radial dimension of the lips 38a, 38b is approximately equal to the thickness (e.g. in a direction perpendicular to the radius of the spacer segment 32) of the lips, or in other words the lips 38a, 38b in this example have a generally square or rectangular profile. The distance between the lips 38a, 38b across the outer face 35b of the spacer segment 32 (e.g. in a direction perpendicular to the radius of the spacer segment 32) is approximately equal to the width of the clamp arms 22, 24 (e.g. in a direction parallel to the axis X of the pipe 5). Therefore each spacer segment 32 can be positioned adjacent to one (or both) of clamp arms 22, 24 such that either clamp arm 22 or 24 is disposed within a recess 39 formed between the lips 38a, 38b, and either inner face 22c or 24c of the clamp arm 22, 24 contacts the outer face 35b of spacer segment 32.

Two example variations of spacer segments 32 are illustrated in perspective view in FIGS. 4a and 4b. The spacer segment 32 in FIG. 4a is generally similar to the spacer segment 32 in FIG. 4b, but the end surface 34a of the spacer segment 32 in FIG. 4a has a similar radial dimension to the opposing end surface 34b, while the end surface 34a of the spacer segment 32 in FIG. 4b has a larger radial dimension than the opposing end surface 34b. In other words, the radial dimension of the spacer segment 32 in FIG. 4a between end surfaces 34a, 34b is generally constant, while the radial dimension of the spacer segment in FIG. 4b decreases, or tapers, between the end surfaces 34a, 34b. However, the radial dimensions of the lips 38a, 38b, and the width of the recesses 39 between the lips 38a, 38b, are equivalent for both the spacer segments 32 shown in FIGS. 4a and 4b.

Figure 5A:
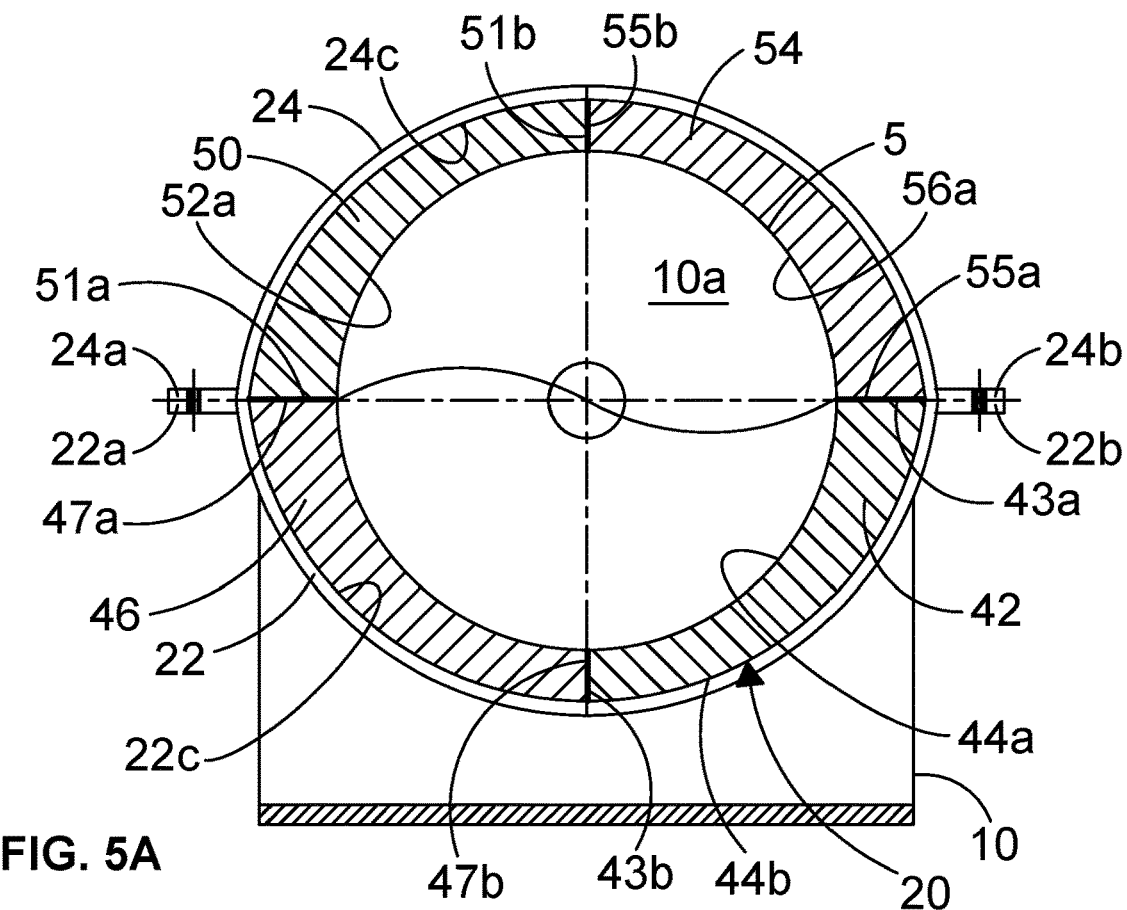
FIG. 5a is a front elevation view of the pipe support assembly shown in FIG. 1, with spacer segments adapted and arranged to surround a pipe positioned centrally within the body aperture

The assembly sequence of a pipe support assembly in which the pipe 5 is centred within the aperture 10a of the body 10 is illustrated in FIG. 5a. The assembly sequence of other pipe support assemblies, in which the centre of the pipe 5 is not aligned with the centre of the aperture 10a, but is offset horizontally and/or vertically from the centre of the aperture 10a, is then illustrated in FIGS. 5b to 5f.

Prior to assembly of the pipe support assembly shown in FIG. 5a, the body 10 is typically first installed onto the supporting structure that will carry the pipe support assembly, and the pipe 5 supported by it. The pipe 5 is then run through the aperture 10a of the pipe support assembly (and typically, also through the apertures of other neighbouring pipe support assemblies that will also support the pipe 5), and a temporary support is optionally provided to allow the position of the pipe 5 to be maintained relative to the body 10 while the pipe support assembly is being assembled and particularly while the spacer 30 is being made and inserted. The dimensions of the annular space between the outer surface of the pipe 5 and the inner faces 22c, 24c of the clamp arms 22, 24 are then measured at different positions around the pipe 5, typically either by direct measurement with a measuring gauge, or by a scanning process using e.g. a hand held laser scanner, or by photogrammetry which allows the profile of the space between the outer surface of the pipe 5 and the inner faces 22c, 24c of the clamp arms 22, 24 to be captured. Once the dimensions of the annular space have been measured, they are optionally sent (e.g. transmitted or entered into) software controlling a 3D printer, which then typically prints the spacer segments 32 required to fully assemble the pipe support assembly, in this case as shown in FIG. 5a.

As shown in FIG. 5a, four spacer segments 42, 46, 50 and 54 are installed in the annular space between the pipe 5 and the inner faces 22c, 24c of clamp arms 22, 24. In this example, each spacer segment 42, 46, 50 and 54 has an arc of 90 degrees, and the divisions between the spacer segments 42, 46, 50 and 54 are aligned with the least (and optionally the greatest) radial dimensions of the annular space between the pipe 5 and the clamp arms 22, 24. Although the pipe 5 is centred within the aperture 10a of the body 10, the annular space between the pipe 5 and clamp arms 22, 24 is not circular, due to the lens shape of the aperture 10a described above. Therefore, in this example, the greatest radial dimension of the annular space is at the points adjacent to the ends of the clamp arms 22, 24, and the least radial dimension is at the points circumferentially intermediate the ends of the clamp arms. In general, a division is provided between adjacent spacer segments at the point of least radial dimension of the annular space between the pipe 5 and the fixed clamp arm 22, but not necessarily at the point of least radial dimension of the annular space between the pipe 5 and the removable clamp arm 24, for reasons that will be explained below. In FIGS. 5a-f the centre of the pipe is marked by the intersection of a vertical axis with a sine wave, and the centre of the carrier is shown by the intersection of a horizontal axis with a circle.

Once the required spacer segments 42, 46, 50 and 54 for assembly of the pipe support assembly have been produced, the removable clamp arm 24 is optionally removed or pivotally moved away from the fixed clamp arm 22, in this example by loosening and removing the bolts securing the removable clamp arm 24 to the fixed clamp arm 22. The four spacer segments 42, 46, 50 and 54 are then positioned around the pipe 5, in the sequence shown in FIG. 5a. Typically, each spacer segment 42, 46, 50 and 54 is marked (e.g. with an ordinal insertion sequence number) during 3D printing to indicate the order in which order the spacer segments are installed. Optionally, spacer segments 42, 46 adjacent the fixed clamp arm 22 are installed before spacer segments 50, 54 adjacent the removable clamp arm 23.

In FIG. 5a, spacer segment 42 is inserted first into the lower RHS of the annular space between the pipe 5 and fixed clamp arm 22, typically by a circumferential sliding motion around the outer surface of the pipe 5. For example, the inner face 44a of the spacer segment 42 can be placed upon the outer surface of the pipe 5 outside of the fixed clamp arm 22 (due to the absence of the removed clamp arm 24), and then slid circumferentially around the pipe 5 (e.g. in a clockwise direction) into the position shown in FIG. 5a. Since the radial dimension of the first end surface 43a of spacer segment 42 is slightly greater than the radial dimension of the second end surface 43b, and approximately equal to the greatest radial dimension of the annular space between the pipe 5 and fixed clamp arm 22 adjacent connection plate 22b, it is not possible in this example to insert spacer segment 42 into the annular space with end surface 43a first. Similarly, it is not possible in this example to slide spacer segment 42 further around the pipe 5 (e.g. in a clockwise direction) from the position shown in FIG. 5a, because the radial dimension of the first end surface 43a at the maxima of the segment 42 prevents any further movement beyond the greatest radial dimension of the annular space between the pipe 5 and fixed clamp arm 22 adjacent connection plate 22b.

Alternatively, spacer segment 42 can be inserted into the annular space by a circumferential sliding motion around the inner face 22c of the fixed clamp arm 22, for example by placing the outer face 44b of the spacer segment 42 on the inner face 22c of the fixed clamp arm 22. This has the advantage that the spacer segment 42 is axially aligned with the fixed clamp arm 22, due to the fixed clamp arm 22 being received within the recess (not shown in FIG. 5a) between the radial lips on the outer face 44b of the spacer segment 42, before the spacer segment is inserted into the annular gap around the pipe 5. The result is the same, with the segment maxima at end 43a limiting further circumferential clockwise movement beyond the position shown in FIG. 5a.

When the spacer segment 42 has been inserted into the position shown in FIG. 5a, the segment minima at the second end surface 43b (which has a smaller radial dimension than first end surface 43a) is circumferentially aligned with the point of least radial dimension of the annular space between the pipe 5 and the fixed clamp arm 22. This ensures that when the adjacent spacer segment 46 is inserted into the annular space around the pipe 5, the second end surface 47b of spacer segment 46 will closely approach, or preferably contact, the second end surface 43b of spacer segment 42, at the point where the radial dimensions of both the second end surface 43b (of segment 42) and the second end surface 47b (of segment 46) are approximately equal to the radial dimension of the annular space around the pipe 5. Thus, the spacer segments 42, 46 in this example completely fill the annular space around the pipe 5 in the vicinity of the division between the segments 42, 46. Similarly, the end surfaces of all spacer segments 42, 46, 50, 54 in this example advantageously contact the end surfaces of adjacent spacer segments when the pipe support assembly is fully assembled, in order to provide a uniform and continuous support around the entire outer surface of the pipe 5.

After spacer segment 42 has been inserted, spacer segment 46 is inserted in a similar manner, so that the second end surface 47b of spacer segment 46 contacts the second end surface 43b of spacer segment 42, as described above.

Thus, the first end surfaces 43a, 47a of spacer segments 42, 46 are aligned with the ends of the fixed clamp arm 22. Providing the division at the radial minimum (i.e. at the end surface 43b) has the advantage that the end surfaces 43b and 47b can move into contact to completely fill the radial gap thereby providing better support to the pipe.

Spacer segments 50 and 54 are then placed onto the pipe 5, optionally by radial rather than circumferential movement, so that the inner faces 52a, 56a of segments 50, 54 are in contact with the outer surface of the pipe 5. Therefore, as shown in FIG. 5a, second end surfaces 51b, 55b of segments 50, 54 abut each other, while first end surface 51a of segment 50 abuts first end surface 47a of segment 46, and first end surface 55a of segment 54 abuts first end surface 43a of segment 42. Segments 50, 54 are also axially aligned with spacer segments 42, 46, so that removable clamp arm 24 can then be positioned in the recess (not shown in FIG. 5a) between the radial lips of segments 50 and 54 such that the apertures 25a, 25b (see FIG. 2) of the removable clamp arm 24 align with the apertures 23a, 23b of the fixed clamp arm 22.

In this example, segments 50 and 54 are separated, but in other examples, segments 50 and 54 could be formed as a single segment, with an arc of approximately 180 degrees. In such examples, the spacer 30 would therefore comprise only three segments.

After removable clamp arm 24 has been positioned in the recess between the radial lips of segments 50 and 54, the bolts are then replaced through connection plates 22a, 22b, 24a, 24b and tightened. Tightening the bolts urges connection plates 22a and 24a, and 22b and 24b, toward each other, thereby tensioning the fixed and removable clamp arms 22, 24 around the spacer segments 42, 46, 50 and 54. As the segments 42, 46, 50 and 54 are radially tensioned by the clamp arms 22, 24, the divisions between the segments 42, 46, 50 and 54 are circumferentially compressed, ensuring that the entire outer circumference of the pipe 5 is fully supported by segments 42, 46, 50 and 54.

After the bolts have been tightened, relative axial movement between the spacer segments and the clamp arms is substantially prevented by the lips of the spacer segments which radially overlap, and optionally extend beyond, both axial sides of clamp arms 22, 24 after the clamp arms have been tensioned around spacer segments 42, 46, 50 and 54. This advantageously prevents the segments 42, 46, 50 and 54 from slipping axially out of the annular space around the pipe 5 and no longer providing adequate support to the pipe 5, particular in the case where the pipe 5 is prone to vibration during use.

Figure 5B:
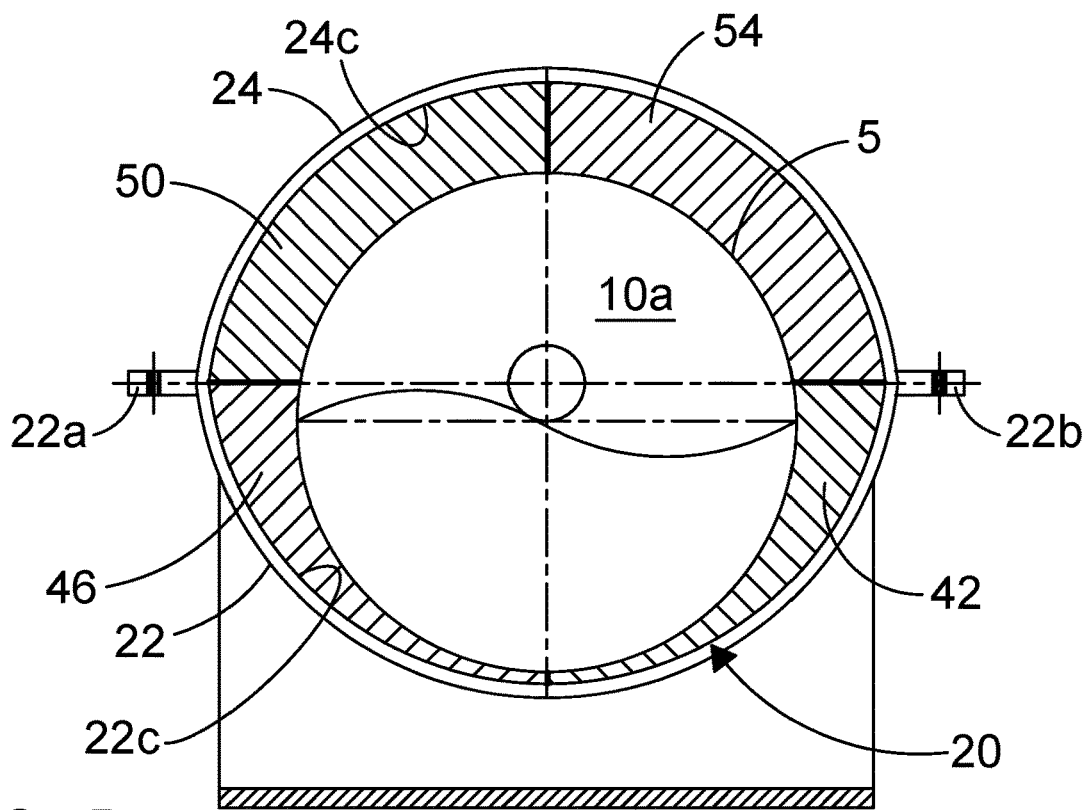
FIGS. 5b to 5f are respectively front elevation views of the pipe support assembly shown in FIG. 1, with spacer segments adapted and arranged to surround a pipe offset in the body aperture toward the 6 o'clock, 12 o'clock, 1 o'clock, 7 o'clock and 9 o'clock positions.

The pipe support assembly shown in FIG. 5b is assembled in a similar way to the pipe support assembly shown in FIG. 5a. In FIG. 5b, the pipe 5 is not centred within the aperture 10a of the body 10, but is offset toward a 6 o'clock position relative to the clamp 20. In this example, four spacer segments 42, 46, 50 and 54 are also installed in the annular space around the pipe 5, and each spacer segment 42, 46, 50 and 54 also has an arc of 90 degrees. Also in this example, the least radial dimension of the annular space around the pipe 5 is circumferentially intermediate the ends of the fixed clamp arm 22, while the radial dimension of the annular space between the pipe 5 and the removable clamp arm 24 is approximately constant. Therefore, there is a division between segments 42 and 46 circumferentially intermediate the ends of the fixed clamp arm 22, aligned with the least radial dimension of the annular space around the pipe 5, as explained previously for the example shown in FIG. 5a. Spacer segments 42, 46, 50 and 54, and removable clamp arm 24, are otherwise installed in the same manner as described for the example shown in FIG. 5a.

In addition to substantially preventing axial movement of the spacer segments 42, 46, 50 and 54 relative to the fixed and removable clamp arms 22, 24, the clamp arms 22, 24 also substantially prevent rotation of the segments 42, 46, 50 and 54 around the inner faces 22c, 24c of the clamp arms 22, 24 when the clamp device is made up and fastened, due to the non-circular shape of the aperture 10a formed by the clamp arms 22, 24. In examples of the pipe support assembly similar to that shown in FIG. 5b, in which the centre of the pipe 5 is offset from the centre of the aperture 10a, this prevents the pipe 5 from being displaced from its initial position. In other words, by preventing rotation of the segments 42, 46, 50 and 54, the centre of the pipe 5 is maintained in a stationary position. This can advantageously prevent undesirable stress, strain or bending of the pipe 5 which might otherwise occur if the centre of the pipe 5 was allowed to deviate from its initial position relative to the aperture 10a of the pipe support assembly.

Figure 5C:
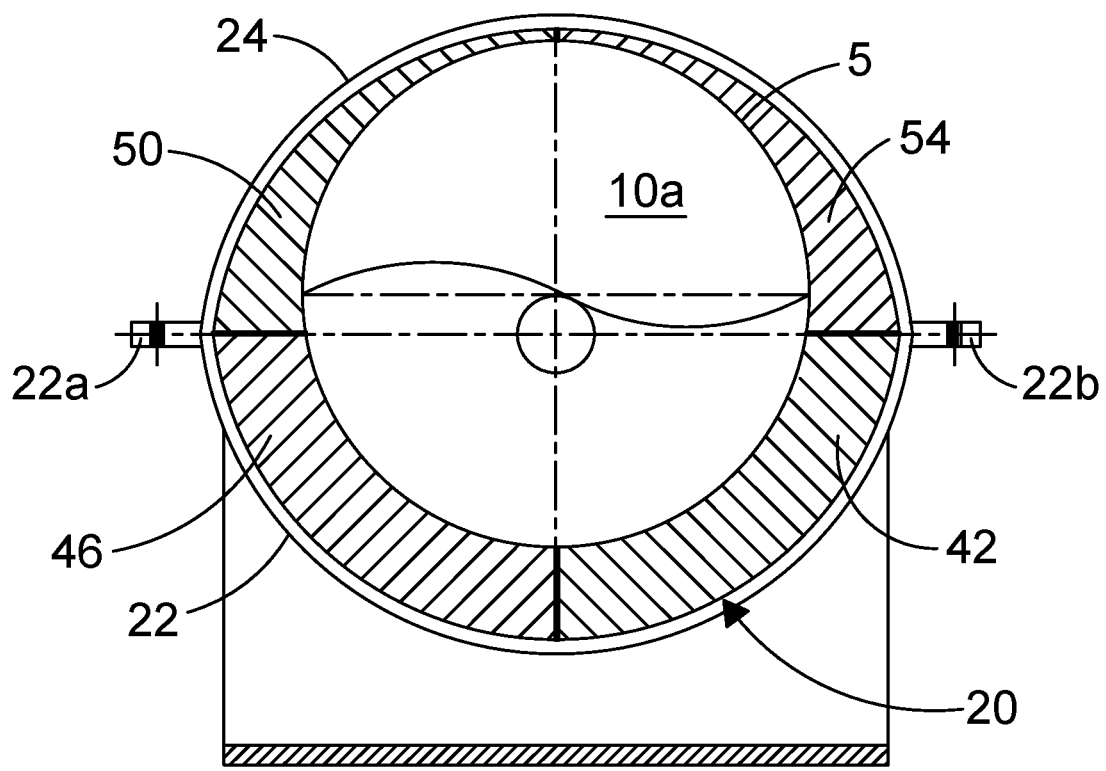

The pipe support assembly shown in FIG. 5c is also assembled in a similar way to the pipe support assemblies shown in FIGS. 5a and 5b. In FIG. 5c, the pipe 5 is offset toward a 12 o'clock position relative to the clamp 20. In this example, four spacer segments 42, 46, 50 and 54, each with an arc of 90 degrees, are also installed in the annular space around the pipe 5. In this example, the least radial dimension of the annular space around the pipe 5 is circumferentially intermediate the ends of the removable clamp arm 24, while the radial dimension of the annular space between the pipe 5 and the fixed clamp arm 22 is approximately constant. Therefore in this example, the position of the division between segments 42 and 46 is not restricted to a specific angular location (since there is no point of least radial dimension of the annular space between the pipe 5 and fixed clamp arm 22) and instead, for example, segment 42 could have an arc of 60 degrees and segment 46 could have an arc of 120 degrees, without any change to the assembly sequence or insertion order of the spacer segments. Spacer segments 42, 46, 50 and 54, and removable clamp arm 24, are otherwise installed in the same manner as described for the examples shown in FIGS. 5a and 5b.

Optionally the centreline of the pipe is below the centreline of the clamp radius. Optionally the radial spacing between the pipe and the clamp at 6 o'clock is equal to or less than the corresponding radial spacing at 3 and 9 o'clock.

Figure 5D:
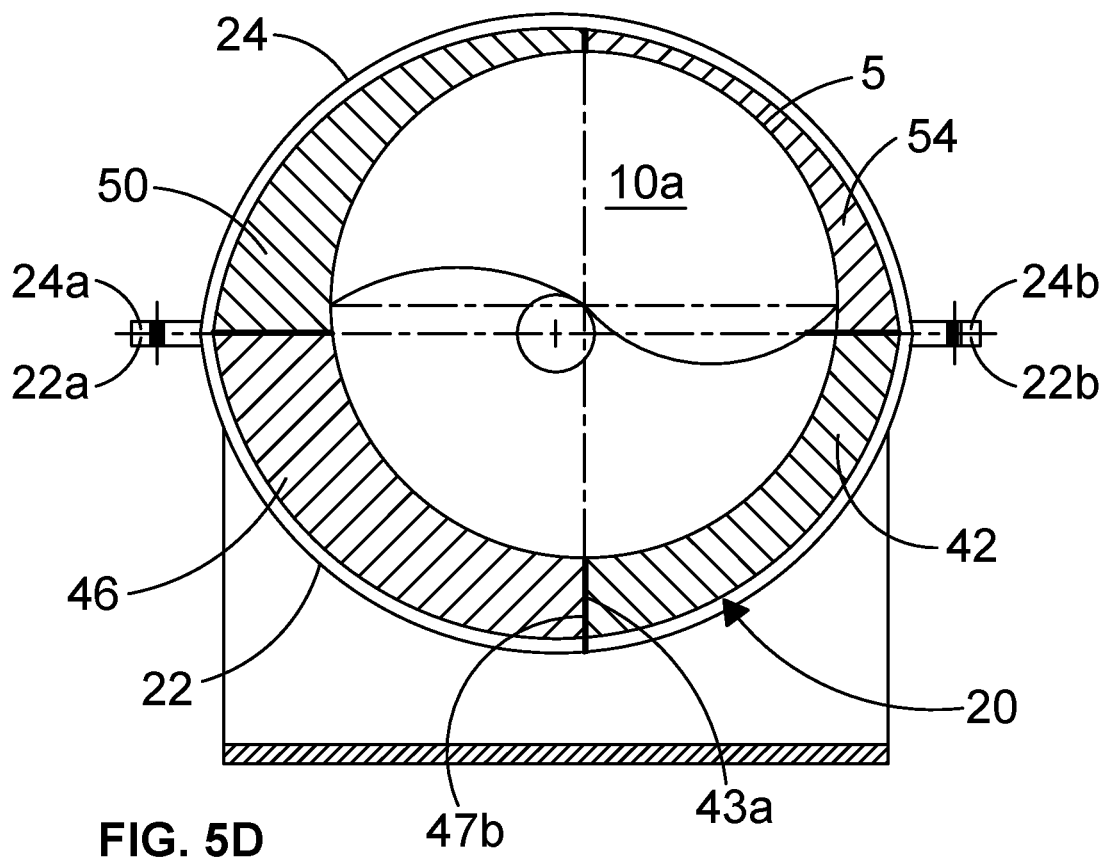

The pipe support assembly shown in FIG. 5d is again assembled in a similar way to the pipe support assemblies shown in FIGS. 5a, 5b and 5c. In FIG. 5d, the pipe 5 is offset toward a 1 o'clock position relative to the clamp 20. Therefore in this example, the least radial dimension of the annular space around the pipe 5 is circumferentially closer to the end of removable clamp arm 24 adjacent to connection plate 24b, compared to the point of least radial dimension in the example shown in FIG. 5c. The least radial dimension of the annular space between the pipe 5 and the fixed clamp arm 22, which determines the angular position of the division between spacer segments 42 and 46, is located at the ends of the clamp arms 22, 24 adjacent to connection plates 22b, 24b. Therefore in contrast to the examples shown in FIGS. 5a, 5b and 5c, in this example spacer segment 42 is inserted into the annular space around the pipe 5 by sliding the segment 42 right around pipe 5 in an anti-clockwise direction from the end of the fixed clamp arm 22 adjacent to connection plate 22a. When spacer segment 42 is in the position shown in FIG. 5d, spacer segment 46 is also slid around pipe 5 in an anti-clockwise direction in a following motion, until the second (e.g. smaller) end surface 47b of segment 46 abuts the first (e.g. larger) end surface 43a of segment 42. Spacer segments 50 and 54, and removable clamp arm 24, are then installed in the same manner as described for the examples shown in FIGS. 5a-5c.

Figure 5E:
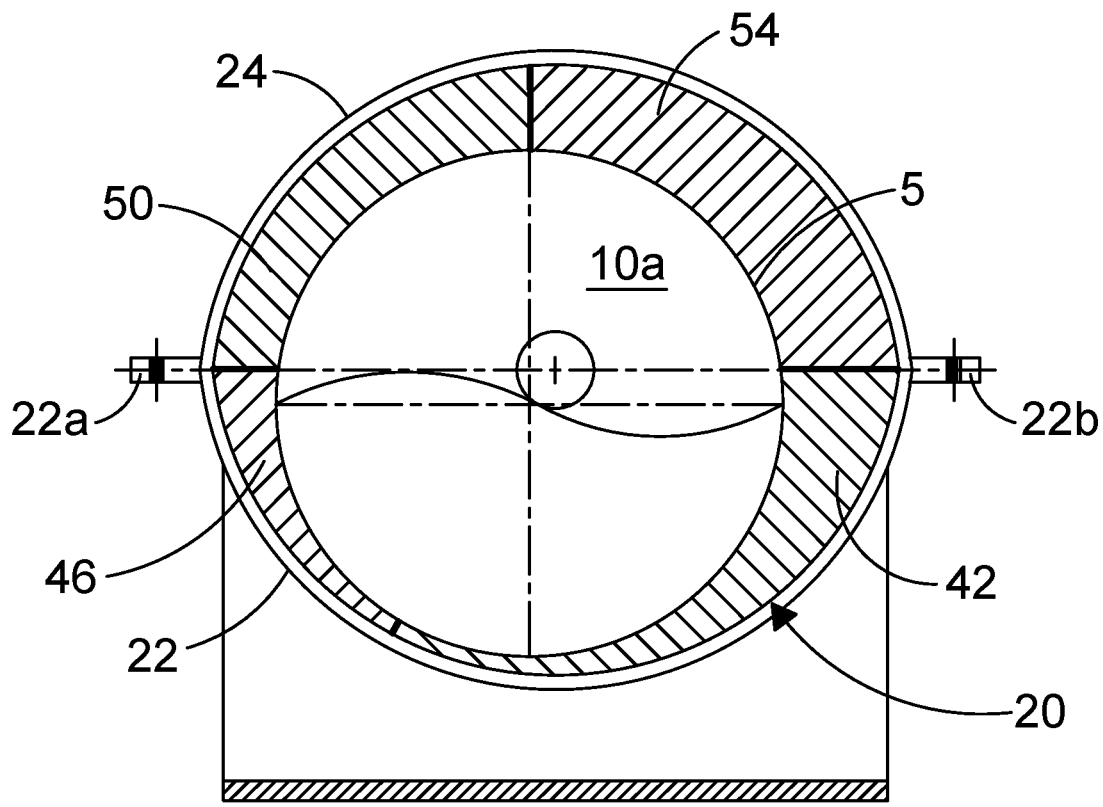

The pipe support assembly shown in FIG. 5e is also assembled in a similar way to the pipe support assemblies shown in FIGS. 5a, 5b, 5c and 5d. In FIG. 5e, the pipe 5 is offset toward a 7 o'clock position relative to the clamp 20. Therefore in this example, the least radial dimension of the annular space around the pipe 5 (which is also the least radial dimension of the annular space between the pipe 5 and the fixed clamp arm 22) is circumferentially closer to the end of the fixed clamp arm 22 adjacent to connection plate 22a. Therefore, in contrast to the examples shown in FIGS. 5a, 5b, 5c and 5d, in this example the arcs of spacer segments 42 and 46 are approximately 110 degrees and 70 degrees respectively, instead of 90 degrees. Apart from this difference, spacer segments 42, 46, 50 and 54, and removable clamp arm 24, are otherwise installed in the same manner as described for the examples shown in FIGS. 5a-5d.

Figure 5F:
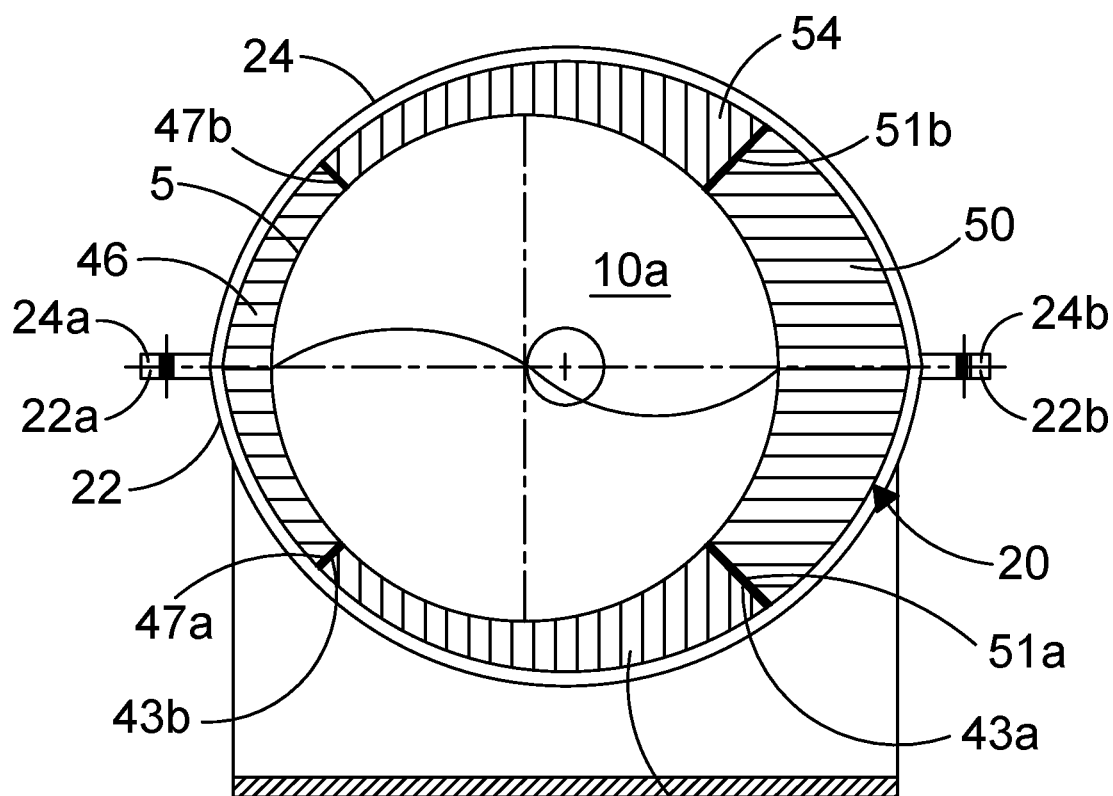

In the pipe support assembly shown in FIG. 5f, the pipe 5 is offset toward a 9 o'clock position relative to the clamp 20. Therefore in this example, there are two separated points of equal least radial dimension of the annular space around the pipe 5, which are located at positions equidistantly offset either side of the connection plates 22a, 24a at the first ends of the fixed and removable clamp arms 22, 24. As described in previous examples, the point of least radial dimension of the annular space between the pipe 5 and the fixed clamp arm 22 determines the angular position of the division between spacer segments 42 and 46. However, in contrast to the example shown in FIG. 5e, in this example all of the spacer segments 42, 46, 50 and 54 have an arc of 90 degrees. Furthermore, the radial dimensions of the end surfaces 47a, 47b of segment 46 are approximately equal to each other, as are the end surfaces 51a, 51b of segment 50, and the greatest radial dimension of segments 46 and 50 is at a midpoint between the end surfaces 47a, 47b and 51a, 51b, which is aligned with the connection points of the fixed and removable clamp arms 22, 24 when the pipe support assembly is fully assembled.

In this example, segments 42, 46 and 50 are all inserted (either completely or partially) into the annular space between the pipe 5 and the fixed clamp arm 22. Segment 42 is first inserted into the annular space by sliding the segment around the pipe 5 in a clockwise direction from the end of the fixed clamp arm 22 adjacent to connection plate 22b, until the radial dimension of the first (e.g. larger) end surface 43a fills the annular space and prevents any further sliding movement of the segment 42. Segment 46 is then inserted by sliding the segment around the pipe 5 in an anti-clockwise direction from the end of the fixed clamp arm 22 adjacent to connection plate 22a, until the first end surface 47a of segment 46 abuts the second (e.g. smaller) end surface 43b of segment 42, as shown in FIG. 5f. Next, segment 50 is inserted by sliding the segment around the pipe 5 in a clockwise direction from the end of the fixed clamp arm 22 adjacent to connection plate 22b, until the first end surface 51a of segment 50 abuts the first (e.g. larger) end surface 43a of segment 42, as also shown in FIG. 5f. Finally, segment 54 is placed onto the pipe 5, and removable clamp arm 24 is installed in the same manner as described for the examples shown in FIGS. 5a-5e.

Figure 6:
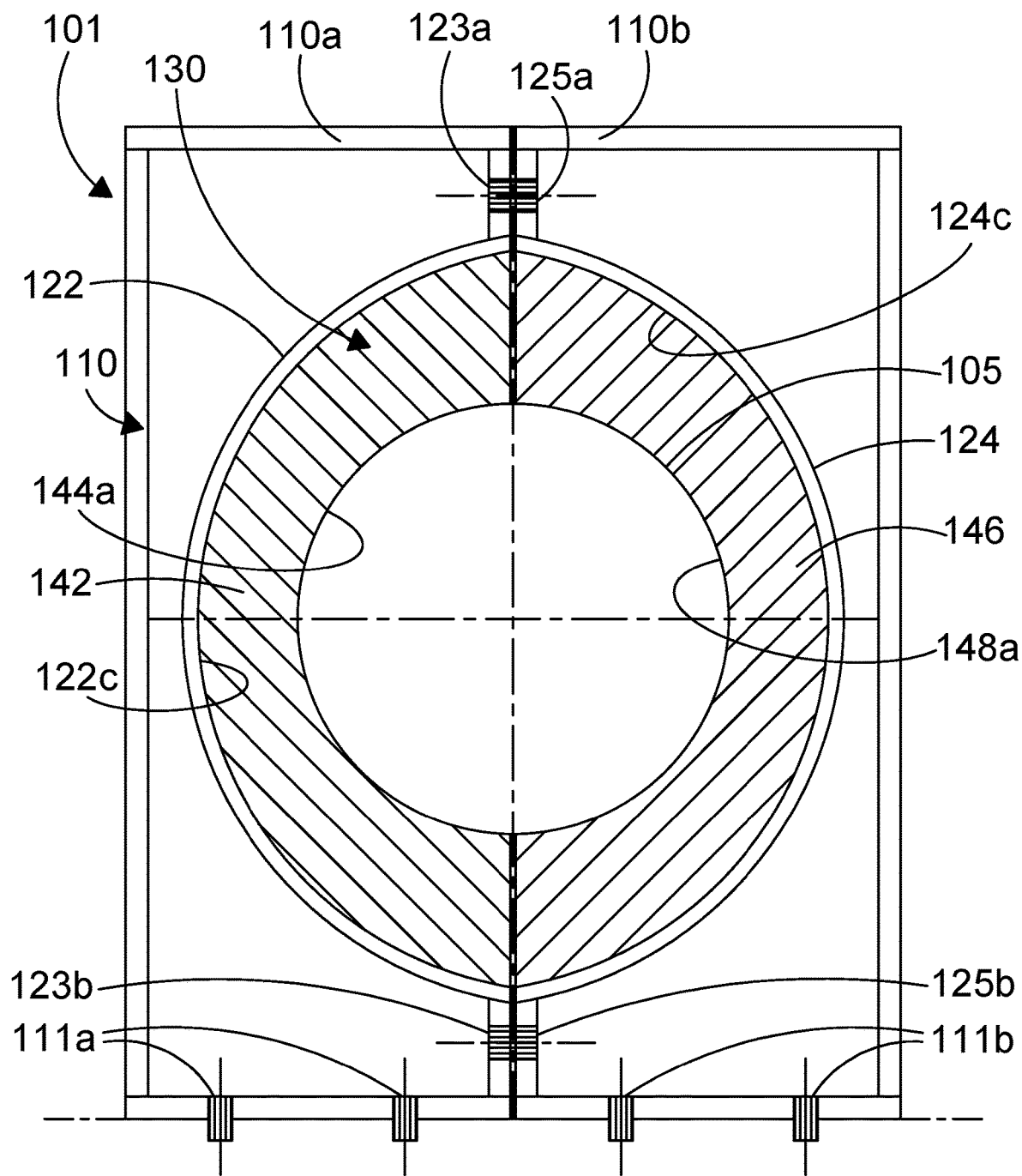
FIG. 6 is a front elevation view of a second example of a pipe support assembly.

A second example of a pipe support assembly 101 in accordance with the present invention is shown in FIG. 6. The second example is generally similar to the first example described above, and equivalent parts are numbered similarly, but the reference numbers are increased by 100. In the second example, the body 110 comprises two separable halves or portions 110a. 110b, and each of the clamp arms 122, 124 is permanently attached to a corresponding body portion 110a, 110b. Each of the body portions 110a, 110b also comprises at least one fixing aperture 111a, 111b. In this example, as shown in FIG. 6, each body portion 110a,110b has two fixing apertures 111a, 111b, in addition to the apertures 123a, 123b, 125a, 125b at the ends of clamps arms 122, 124, which in this example receive fixing elements e.g. bolts (not shown in FIG. 6) for connecting the clamp arms 122, 124.

Therefore, in this example both clamp arms 122, 124 are removable from the pipe 105, by removing body portions 110a, 110b, in contrast to the first example described above in which only clamp arm 24 was removable, while clamp arm 22 was rigidly joined to body 10, which typically remained fixed to the supporting structure after initial installation. The spacer 130 of the second example is divided into only two segments 142, 146. Both spacer segments 142, 146 are applied to the pipe 105 radially, without any significant circumferential component of motion, after both clamp arms 122, 124 are removed, as described below.

As also shown in FIG. 6, in this example axes passing through the opposing distal ends of the clamp arms 122, 124 when the clamp arms are connected to each other are typically perpendicular to the fixing surface to which the body 110 of the pipe support assembly 101 is fixed.

Prior to assembly of the pipe support assembly 101 shown in FIG. 6, the body portions 110a, 110b are typically first installed onto the supporting structure that will carry the pipe support assembly, by passing bolts or other fasteners through fixing apertures 111a, 111b. At this stage, it is not necessary to also connect clamp arms 122, 124 through apertures 123a, 123b, 125a, 125b at the ends of clamps arms 122, 124. The pipe 105 is then run through the pipe support assembly 101, in the same manner as when installing the first example of the pipe support assembly 1. The dimensions of the annular space between the outer surface of the pipe 105 and the inner faces 122c, 124c of the clamp arms 122, 124 are then measured at different positions around the pipe 105, and the spacer segments 142, 146 required to fully assemble the pipe support assembly 101 are then typically produced by a 3D printer.

In this example the arcs of the inner surfaces 144a, 148a of spacer segments 142, 146 are approximately 180 degrees, or in other words, the inner surfaces of spacer segments 142, 146 are generally semi-circular.

The body portions 110a, 110b are removed from the supporting structure, thus also removing clamp arms 122, 124 from the pipe 105. The two spacer segments 142, 146 are then positioned around the pipe 105. In this example, it is not important which of spacer segments 142, 146 is applied to the pipe first. Both spacer segments 142, 146 are applied to the pipe 105 in a radial direction, without any significant circumferential component of motion.

Body portions 110a, 110b are then returned to the supporting structure and clamp arms 122, 124 are positioned in the recesses between the radial lips of the segments 142, 146, in the same manner as when installing the first example of the pipe support assembly 1. The clamp arms 122, 124 are then connected by passing bolts or other fasteners through apertures 123a, 123b, 125a, 125b at the ends of clamps arms 122, 124, before the body portions 110a, 110b are then fixed to the supporting structure by replacing the bolts or other fasteners through fixing apertures 111a, 111b.

The skilled reader will understand that the dimensions provided in this disclosure are exemplary only, and that the invention may be performed using different dimensions, radii, etc.

What is claimed is:

1. A pipe support assembly comprising:
a body having a clamp device adapted to clamp the pipe within an aperture in the body, the clamp device having first and second clamp arms and a fastening mechanism;
a spacer adapted to be received within the aperture in the body, having an inner face adapted to engage the pipe and an outer face adapted to engage at least one of the first and second clamp arms when the pipe is clamped in the clamp device to space at least one of the first and second clamp arms from the pipe;
the spacer comprising at least two spacer segments;
wherein the aperture is non-circular;
wherein each of the first and second clamp arms comprises an arcuate inner face which forms an arc of a circle that is less than a full semi-circle;
wherein each spacer segment has a first circumferential end and a second circumferential end, and wherein in at least two spacer segments in the spacer, the first circumferential end has a larger radial dimension than the second circumferential end;
and wherein each of the at least two spacer segments has a tapered arcuate profile between the first and second circumferential ends.

2. A pipe support assembly as claimed in claim 1, wherein the segments of the spacer are non-identical.

3. A pipe support assembly as claimed in claim 1, wherein each spacer segment comprises an inner face comprising an arc with a first radius, and an outer face comprising an arc with a second radius, and wherein the first radius is less than the second radius, and wherein the arc of the inner face and the arc of the outer face have offset centres.

4. A pipe support assembly as claimed in claim 1, wherein the radial dimension of each spacer segment decreases continuously between the first and second circumferential ends.

5. A pipe support assembly as claimed in claim 1, wherein a division between adjacent spacer segments is aligned with a minimum of the radial dimension of the spacer.

6. A pipe support assembly as claimed in claim 1, wherein the first and second clamp arms are symmetrical, and the centres of the arcs of the inner faces of the first and second clamp arms are offset from each other.

7. A pipe support assembly as claimed in claim 1, wherein the aperture is lens-shaped.

8. A pipe support assembly as claimed in claim 1, wherein the non-circular aperture locks the position of one of the pipe and the spacer segments relative to the clamp device after the spacer segments have been inserted into the space between the pipe and the clamp device, and the pipe is clamped in the clamp device.

9. A pipe support assembly as claimed in claim 1, wherein the spacer comprises at least three segments.

10. A method of supporting a pipe with a pipe support assembly, the pipe support assembly comprising:
a body having a clamp device adapted to clamp the pipe within an aperture, the clamp device having first and second clamp arms and a fastening mechanism,
a spacer adapted to be received within the aperture in the body, having an inner face adapted to engage the pipe and an outer face adapted to engage at least one of the first and second clamp arms when the pipe is clamped in the clamp device to space at least one of the first and second clamp arms from the pipe, wherein the aperture is non-circular, and wherein the method comprises:
assembling the clamp device around the pipe such that the pipe is disposed in the aperture;
measuring the radial distance between an inner face of the first and second clamp arms and the outer surface of the pipe in a number of different spaced apart locations around the circumference of the pipe;
forming the spacer for the pipe support assembly in at least two segments based on the measured data concerning the measured radial distance between the clamp arms and the pipe, wherein each spacer segment has a first circumferential end and a second circumferential end, and wherein in at least two spacer segments in the spacer, the first circumferential end has a larger radial dimension than the second circumferential end, and wherein each of the at least two spacer segments has a tapered arcuate profile between the first and second circumferential ends;
inserting the at least two spacer segments between the inner face of the clamp arms and the outer surface of the pipe; and
closing the clamp arms around the outer face of the spacer segments to clamp the pipe within the aperture.

11. A method of supporting a pipe as claimed in claim 10, wherein the method includes performing the measurement of the radial distance between the first and second clamp arms and the pipe by photogrammetry.

12. A method of supporting a pipe as claimed in claim 10, wherein the method includes inserting the second circumferential end of at least two spacer segments between the pipe and at least one of the clamp arms before the first circumferential end of the said at least two spacer segments.

13. A method of supporting a pipe as claimed in claim 10, wherein the method includes moving at least two of the spacer segments between at least one of the clamp arms and the pipe in a circumferential direction with respect to the pipe.

14. A method of supporting a pipe as claimed in claim 10, including forming the spacer segments by additive manufacturing.

15. A method as claimed in claim 10, including maintaining the position of the pipe relative to the body before the spacer is installed and after the pipe extends through the aperture by engaging a temporary support device between the pipe and the body in a radial plane spaced apart from a plane of the spacer along the axis of the pipe.

16. A method as claimed in claim 15, wherein the temporary support device comprises an adjustment mechanism, and wherein the method includes adjusting the relative position of the pipe within the pipe support using the adjustment mechanism.

17. A method as claimed in claim 10, wherein each of the first and second clamp arms comprises an arcuate inner face which forms an arc of a circle that is less than a full semi-circle.

18. A pipe support assembly comprising:
a body having a clamp device adapted to clamp the pipe within an aperture in the body, the clamp device having first and second clamp arms and a fastening mechanism;
a spacer adapted to be received within the aperture in the body, having an inner face adapted to engage the pipe and an outer face adapted to engage at least one of the first and second clamp arms when the pipe is clamped in the clamp device to space at least one of the first and second clamp arms from the pipe;

the spacer comprising at least two non-identical spacer segments;

wherein the aperture is non-circular and wherein the non-circular aperture locks the position of the spacer segments relative to the clamp device after the spacer segments have been inserted into the space between the pipe and the clamp device and the pipe is clamped by the clamp device;

wherein each spacer segment has a first circumferential end and a second circumferential end, and wherein in at least two spacer segments in the spacer, the first circumferential end has a larger radial dimension than the second circumferential end;

wherein each of the at least two spacer segments has a tapered arcuate profile between the first and second circumferential ends;

wherein the first and second clamp arms are symmetrical, each comprising an inner face which forms an arc of a circle that is less than a full semi-circle and wherein the centres of the arcs of the inner faces of the first and second clamp arms are offset from each other.

19. A pipe support assembly as claimed in claim 18, including a temporary support device extending between the pipe and the body in a radial plane spaced apart from a plane of the spacer along the axis of the pipe.

20. A pipe support assembly as claimed in claim 19, wherein the temporary support device comprises an adjustment mechanism.

* * * * *